United States Patent
Schöfberger et al.

(10) Patent No.: US 6,797,016 B1
(45) Date of Patent: Sep. 28, 2004

(54) DYE COMPOSITION, THEIR PRODUCTION AND THEIR USE

(75) Inventors: Georg Schöfberger, Basel (CH); Klaus Körte, Ettingen (CH); Jürgen Geiwiz, Lörrach-Hauingen (DE)

(73) Assignee: Clariant Finance (BVI) Limited, Tortola (VG)

( * ) Notice: Subject to any disclaimer, the term of this patent is extended or adjusted under 35 U.S.C. 154(b) by 140 days.

(21) Appl. No.: 10/130,417

(22) PCT Filed: Nov. 22, 2000

(86) PCT No.: PCT/IB00/01727

§ 371 (c)(1),
(2), (4) Date: May 17, 2002

(87) PCT Pub. No.: WO01/38444

PCT Pub. Date: May 31, 2001

(30) Foreign Application Priority Data

Nov. 24, 1999 (EP) ............................................. 99811082

(51) Int. Cl.$^7$ ............................. D06P 3/80; C09B 67/26
(52) U.S. Cl. ....................... 8/611; 8/506; 8/522; 8/527; 8/543; 8/673; 8/680
(58) Field of Search ........................... 8/506, 522, 527, 8/543, 611, 673, 680

(56) References Cited

U.S. PATENT DOCUMENTS

| | | |
|---|---|---|
| 3,993,442 A | 11/1976 | Economy et al. |
| 3,995,997 A | 12/1976 | Boehmke et al. |
| 4,111,650 A | 9/1978 | Lacroix et al. |
| 4,721,633 A * | 1/1988 | Baldassin .................. 427/212 |
| 4,816,244 A | 3/1989 | Starkweather |
| 5,423,100 A * | 6/1995 | Misawa et al. ................ 8/489 |

FOREIGN PATENT DOCUMENTS

| | | |
|---|---|---|
| EP | 0 122 224 | 10/1984 |
| EP | 0 508 443 | 10/1992 |
| EP | 0 555 868 | 8/1993 |
| FR | 2 240 940 | 3/1975 |
| FR | 2 316 297 | 1/1977 |
| GB | 1 545 529 | 8/1979 |

OTHER PUBLICATIONS

PCT International Search Report for application No. PCT/IB 00/01727, mail date Jan. 2, 2001.
English abstract for EP 0122224, Oct. 17, 1984.
XP–002136670, English abstract for JP 07118585, May 9, 1995.

* cited by examiner

*Primary Examiner*—Margaret Einsmann
(74) *Attorney, Agent, or Firm*—Anthony A. Bisulca

(57) ABSTRACT

Concentrated dye compositions (P) which are solutions of y % by weight of at least one anionic dye (A) in a solution of x % by weight of benzyl alcohol (B) in water, and z % by weight of at least one formulation additive (F),
in which
  x is a number in the range from 0.5 to 4,
  y is a number in the range from 5 to 35
and
  z is a number in the range from 0 to 2,
and are essentially free from alcohols other than (B) and from solvents or solubilizers other than water and (B)
are distinguished by their surprisingly good stability and can be used for any desired dyeing methods for which the respective dyes (A) themselves can be employed, be it for the dyeing of fibre material or be it, in particular, for the coloring of non-fibrous substrates.

14 Claims, No Drawings

DYE COMPOSITION, THEIR PRODUCTION AND THEIR USE

For the use of water-soluble anionic dyes, liquid formulations are preferred in industry. Since it is generally not always possible, even in the case of very readily soluble anionic dyes, to prepare highly concentrated aqueous solutions which contain the dye, even at high concentration, in fully dissolved form and/or are sufficiently stable, in particular are sufficiently storage and transport stable and also stable during application, for example during spraying, organic solvents and optionally solubilizers have been employed to produce corresponding aqueous/organic concentrated dye solutions. Aqueous/organic dye solutions of this type are particularly welcome if the solutions are applied directly, for example for spraying, spray dyeing or for other similar application methods.

It is known, for example from GB-A-1545529, EP-A-508443 and JP-A-07-118585, to prepare solutions of this type in which, as organic components of the aqueous/organic solution, use is made of solvents and/or solubilizers which belong to the category of alcohols or pyrrolidones or hydrotropes.

GB-A-1545259 uses a mixture of N-methylpyrrolidone, benzyl alcohol and urea for the preparation of an aqueous/organic solution of certain disazo dye in which the total of the amounts of urea and N-methylpyrrolidone preponderates over the amount of benzyl alcohol employed, and where the dye can be employed as the pure product or as a water-moist press cake, but it is also noted therein (page 1, lines 40–41) that a salt content, for example as by-product from the dye production, imparts an unstable character on the liquid composition, and so it is recommended therein to desalinate the dye press cake in advance with hydrochloric acid (in Example 1 up to 1% of salt in the acidic press cake).

EP-A-508443 describes aqueous/organic solutions of certain anionic dyes in which the aqueous/organic phase amounts to from 75 to 85% by weight, where up to at most 50% thereof are water and the organic phase can consist of mono-, di- or trifunctional alcohols, and further organic solvents, such as dioxane, 2-pyrrolidone, methyl lactate, ethyl lactate and butyl lactate, may be present. It is noted therein (page 6, lines 46–47) that the stability of the compositions is impaired if the proportion of water exceeds 50% of the aqueous/organic phase.

Japanese Kokai JP-A-07118585 discloses jet printing inks which comprise similar components.

U.S. Pat. No. 4,816,244 describes certain $C_{4-8}$-alcohols (trihydroxypentane, trihydroxyhexane and benzyl alcohol are listed) and mixtures thereof with other alcohols (glycerol, ethylene glycol, propylene glycol, ethylene glycol monomethyl ether, ethanol, propanol and diethylene glycol are mentioned in a general list) for the preparation of more dilute solutions of certain natural dyes, and all the examples use a trifunctional alcohol (trihydroxyhexane), mostly in a mixture with one or two further aliphatic alcohols, where an excess of alcohol or alcohol mixture compared with the dye is used in the examples, and where it is also mentioned therein (column 2, lines 15–17) that the advantageous properties of the stabilizing alcohols are effective at a dye concentration in the range from 0.01 to 10.0%.

EP-A-122224 describes a process for the production of desalinated yellow stilbene azo(xy) dye solutions by condensation of 4-nitrotoluene-2-sulphonic acid in an aqueous alkaline medium in the presence of a mixture of mono- and di- or tri-($C_{2-4}$-alkanol)-amines, then further addition of di- or tri-($C_{2-4}$-alkanol)-amine after condensation, then desalination by filtration through a membrane or treatment with an acid or with an acidic ion-exchange resin for elimination of the alkali metal ions, while the excess of the alkanolamines is not eliminated; in the specification there are mentioned some adjuvants that may be present, namely formamide, dimethylformamide, glycols, diethylene and triethylene glycols and their mono or dialkylethers, further polyethylene glycols of molecular weight 400 to 4000 or also benzyl alcohol, but particularly urea, namely in a concentration of up to 35% by weight referred to the ready dye solution. The examples describe only dye solutions containing a substantial amount (about 20 or 30%) of urea, which is also in substantial excess over the amount of dye present. Also this document, analogously to GB-A-1545529, illustrates dye compositions which need to have been desalinated and contain a high amount of an adjuvant, which in EP-A-122224 is exemplified with urea.

It is evident from the prior art outlined above that it has been attempted a number of times to prepare stable aqueous/organic solutions of certain anionic dyes, where relevant amounts or certain combinations of organic solvents and/or solubilizers are necessary and in some cases purification processes are also necessary, and thus GB-A-1545524 contains a prejudice against concentrated solutions in which the dye (for example as press cake) contains a salt, EP-A-508443 contains a prejudice against concentrated solutions in which the organic solvent content is less than 50%, and U.S. Pat. No. 4,816,244 contains a prejudice against solutions containing more than 10% of dye. To find of a stable aqueous/organic solution of water-soluble anionic dyes with a high dye content, particularly greater than 10% by weight, and a significantly lower content of organic phase was a problem that had hitherto not been solved.

Surprisingly, it has now been found that concentrated aqueous benzyl alcohol-containing solutions of water-soluble anionic dyes as defined below which are distinguished by their particularly good stability (even if they contain, for example, salt as by-product from their synthesis) and have a flow behaviour which is similar to that of a more dilute aqueous solution and which are perfectly suitable for dye application or other indirect or direct uses for dyeing or colouring of substrates can be prepared using a very small amount of benzyl alcohol, essentially without addition of further alcohols or other organic solvents or solubilizers.

The invention relates to these solutions, to their production, to their use and to the substrates treated therewith, particularly non-fibrous hydrophilic substrates.

A first subject-matter of the invention is thus a concentrated dye composition (P) which is a solution of y % by weight of at least one anionic dye (A) in a solution of x % by weight of benzyl alcohol (B) in water, and z % by weight of at least one formulation additive (F),
in which x is a number in the range from 0.5 to 4, y is a number in the range from 5 to 35 and z is a number in the range from 0 to 2, and is essentially free from alcohols other than (B) and from solvents or solubilizers other than water and (B).

As anionic dyes (A), any desired anionic dyes generally come into consideration, essentially those which are inert towards alcoholic hydroxyl groups, principally (A₁) acid dyes,
(A₂) direct dyes,
(A₃) mordant dyes
and
(A₄) reactive dyes, optionally in hydrolysed form.

As "acid dyes", "direct dyes", "mordant dyes" and "reactive dyes", dyes which are known under these terms generally come into consideration. for example those as defined and described in the "Colour Index" under the names "Acid Dyes", "Direct Dyes", "Mordant Dyes" and "Reactive Dyes" and in particular also as listed therein under these terms. The term hydrolysed form of a reactive dye is taken to mean one which conforms in formula terms to the structure of the respective reactive dye, with the difference that the fibre-reactive substituent (for example F, Cl, Br or a sulphato group) has been converted into OH in the presence of alkali (for example NaOH) or also contains an OH group through water adduction (for example onto a vinylsulphonyl group). Of the said dye categories, preference is given to the acid dyes (A₁). The dyes (A), in particular (A₁), are principally those which contain at least one sulpho group, optionally in salt form, and optionally contain further acid groups (for example carboxyl groups and/or phosphonic acid groups), optionally in salt form. The dyes (A), in particular (A₁), may belong to any desired conventional categories, for example they can be dyes from the anthraquinone, monoazo, disazo, triphenylmethane, quinophthalone or xanthene series. The dyes (A), in particular (A₁), are preferably of relatively small molecular size, for example their molecular weight in the form of the free acid or optionally of an internal salt is in the range from 300 to 1000, preferably in the range from 340 to 800. These dyes advantageously contain from 1 to 4 sulpho groups in the molecule. The number of acid groups, in particular sulpho groups, is advantageously sufficiently large that the dyes—in particular in the form of their salts—are readily water-soluble. The water solubility of (A), particularly of (A₁), is, for example, $\geq 10$ g/l at room temperature (=20° C.), preferably $\geq 20$ g/l, particularly $\geq 40$ g/l. Advantageously, on average from 1 to 3, preferably from 1.5 to 2, benzene rings are present per sulpho group in the molecule of (A₁). Of the azo dyes, the uncomplexed ones are preferred; of the disazo dyes and monoazo dyes, the monoazo dyes are preferred.

In the dye compositions (P) according to the invention, a single dye or also a mixture of two or more of said dyes, advantageously from the same category, can be employed as (A).

In the anionic dyes (A), the respective anionic groups, particularly acid groups, can be in the form of the free acid or preferably in salt form, in particular in the form of the salt of a non-chromo-phoric cation, advantageously in the form of a such a salt or as the salt of a such a cation that favours the water solubility of the dye, particularly so that the dye salt is readily water-soluble. As counterions. in particular cations, alkali metal cations, ammonium cations and alkaline earth metal cations, for example, come into consideration. As alkaline earth metal cations, mention may be made, for example, of calcium and magnesium. As ammonium cation, mention may be made of unsubstituted ammonium or also ammonium ions of low-molecular-weight amines, for example mono-, di- or tri-($C_{1-2}$-alkyl)- and/or -(β-hydroxy-$C_{2-3}$-alkyl)ammonium, for example mono-, di- or triisopropanolammonium, mono-, di- or triethanolammonium and N-methyl-N-ethanolammonium. As alkali metal cations, conventional cations of this type come into consideration, for example lithium, sodium and/or potassium ions. Hydrogen as ion is in the form of the hydronium ion. Of the said cations, the ammonium cations and particularly the alkali metal cations are preferred.

The anionic dyes (A) are dissolved in an aqueous x % solution of (B). The concentration x % by weight is preferably in the range from 1 to 4% by weight. The concentration y % by weight of the anionic dyes (A), preferably (A₁), in the aqueous solution of (B) is preferably greater than 10% by weight and is advantageously in the range from 12 to 30% by weight, in particular in the range from 15 to 28% by weight.

The dyes (A) may optionally comprise smaller proportions of by-products and/or additives from their production and/or formulation, for example extraneous electrolytes (particularly diluents and/or mineral salts from their production) in a concentration of $\leq 30\%$ by weight, for example in the range from 1 to 24% by weight, based on (A), for example sodium chloride, sodium sulphate, sodium carbonate or potassium chloride. (A) preferably comprises less than 10% by weight of mineral salts or other additives. According to a preferred embodiment, use can be made as (A) of purified dyes, in particular also membrane-purified dyes (i.e. those which have been substantially purified in dissolved form by dialysis of extraneous electrolytes and any other by-products and have optionally been dried).

As formulation additives (F), those as can usually be employed for the formulation and maintenance of an aqueous solution come into consideration, in particular (F₁) an antimicrobial agent
or/and
(F₂) at least one acid, at least one base and/or at least one buffer for pH adjustment.

As (F₁), it is generally possible to employ known products as are usually employed for protection against the harmful effect of microorganisms, principally products which inhibit the growth of microorganisms or also microbicides, particularly fungicides. They can be employed in low concentrations, for example of z in the range from 0.01 to 1, in particular from 0.05 to 0.5.

As (F₂), it is possible to use acids, bases or buffers which are conventional per se, as are usually used for the pH adjustment of dye formulations, for example mineral acids, such as hydrochloric acid, sulphuric acid or phosphoric acid, low-molecular-weight aliphatic carboxylic acids, for example having 1 to 6 carbon atoms, such as formic acid, acetic acid, lactic acid or citric acid, or bases, such as alkali metal hydroxides or carbonates, or also aliphatic low-molecular-weight amines, such as those which can be used for the corresponding salt formation of the above-mentioned acid groups, of which ammonia or triethanolamine are preferred. As buffers, it is possible to employ, for example, mono- or disodium phosphate, sodium acetate or ammonium sulphate.

The pH of the concentrated dye compositions (P) can generally be as desired, it is advantageously in the range from 5 to 11, preferably from 6 to 10, particularly preferably from 7 to 10.

"Essentially free from alcohols other than (B) and from solvents or solubilizers other than (B) and water" means that either no alcohols at all other than (B) and no solvents or solubilizers at all other than (B) and water are present or small amounts thereof may be present, for example as dye impurity or in a technical grade of (B), but their proportion, based on (B), is low and does preferably not exceed 10% by weight, more preferably 2% by weight of (B).

The dye compositions (P) according to the invention can be produced in a very simple manner by suitable mixing of the components, in particular by mixing at least one dye (A)

with an aqueous solution of (B) and optionally with (F) or by mixing (B) with a corresponding concentrated solution or/and suspension of (A) and optionally admixing (F). If reactive dyes ($A_4$) are employed, the fibre-reactive substituents can, if desired, simultaneously be hydrolysed under alkaline conditions, for example with an alkali metal hydroxide or carbonate.

The dyes (A) can, in the first variant, be employed in the form of corresponding dry dyes, as occur as blended commercial forms or preferably as moist or also dried filter cakes or also as dialysed solutions, which may optionally be dried. For the second variant, the aqueous (A) solution can be, for example, one which results from membrane filtration of the respective crude dye solution and in which the dye is still dissolved at elevated temperature, for example at temperatures in the range from 30 to 80° C., preferably from 40 to 60° C., or—for example at room temperature—may also be partly precipitated and be, for example, at least partly in the form of a suspension, and then gradually re-dissolves through addition of (B). Hydrolysis of a fibre-reactive substituent in ($A_4$) can be carried out at the same time, preferably before any dialysis, for example at pH 10–12. The addition of (F) can take place at any desired suitable point in time, the addition of ($F_1$) advantageously takes place when (A) has dissolved, advantageously after any dialysis, while the addition of ($F_2$) can take place before or also after any dialysis and/or before or also after the addition of (B).

The compositions (P) according to the invention, in particular produced as described above, are distinguished by their surprisingly good stability, for example they are very storage and transport stable and can be handled very easily. They are also very stable under conditions as can occur during application under strong dynamic stress, for example during spraying through nozzles. They can be used for any desired dyeing methods and colouring methods for which the respective dyes (A) themselves can be employed, be it for the dyeing of fibre material (for example textile material), be it, in particular, for the colouring of non-fibrous substrates, where the dyes (A) can be admixed directly in the form of (P) with the remaining components of the dye liquors, inks or pastes (for example of printing inks or pastes) or—depending on the substrate—applied directly or incorporated into the mass.

The term non-fibrous substrates here is taken to mean, for example, any substrate, in particular any hydrophilic substrate, which is not fibre-containing, such as, in particular, oxide layers produced artificially, in particular anodically, on aluminium or aluminium alloys, free-flowing material, or also polymer-containing compositions or coatings. Particularly preferred substrates are plastic compositions (S), particularly the hydrophilic ones.

For the coloring of plastic compositions (S), it is, in general, possible to use water-soluble plastics or polymers (S'), as are otherwise conventionally employed in corresponding colored compositions, such as, for example, in detergents or in cosmetics. The following may be mentioned principally: polymers and copolymers of ethylenically unsaturated $C_{3-8}$-monocarboxylic acids and optionally $C_{4-8}$-dicarboxylic acids, polyalkylene glycols (principally polyethylene glycols) or polyetherurethanes. The average molecular weights $M_W$ of these polymers can vary in broad ranges, for polycarboxylic acids for example from 5000 to to 5,000,000, advantageously from 50,000 to 200,000, for polyalkylene glycols, in particular polyethylene glycols, for example from 400 to 6000, preferably from 600 to 4000, for polyetherurethanes for example from 10,000 to $10^8$, particularly from $10^5$ to $10^7$.

Particularly worthy of mention are polymers and copolymers (S') which are employed in detergents, principally polycarboxylic acids, in particular (co)polymers of (meth) acrylic acid and optionally maleic acid. The molar ratio of the unsaturated monocarboxylic acids to the unsaturated dicarboxylic acids here is advantageously in the range from 5/5 to 9/1, preferably from 6/4 to 8/2. The unsaturated dicarboxylic acid here is advantageously employed as the anhydride. The polycarboxylic acids are advantageously employed in the form of their alkali metal salts, for example as lithium, sodium or potassium salts, of which sodium salts are preferred.

These polymers (S') are, in particular in the form of their alkali metal salts, water-soluble (i.e. they form, at least under application conditions, true or colloidal solutions in water).

For the production of corresponding dye-containing polymer compositions ($S_P$), the polymers (S) are advantageously mixed in the form of concentrated, aqueous solutions, for example at concentrations in the range from 5 to 80% by weight, preferably from 15 to 50% by weight, with (P) and are optionally mixed with further additives which are suitable for the respective use and are conventional in the respective area of industry. The mixtures produced in this way can either be used directly or, if desired, dried or granulated, for example to give a powder or granular material respectively. According to a further particularly preferred process, the pre-formed polymer specks (S') are sprayed with (P).

A particular subject-matter of the invention is the use of the compositions (P), particularly the blue, red and/or green ones, in detergents, for example as free-flowing, colored granular material (for example in polymers as mentioned above), which as colored specks is mixed with non-dye-containing detergent granular material or, mixed together with all the detergent components, is either in the form of a liquid detergent or in a detergent granular material.

A suitable composition of a colored polymer granular material (S') which is suitable as detergent additive and which contains, as polymer, a polycarboxylic acid is one which advantageously contains from 10 to 70% by weight, preferably from 20 to 40% by weight, of polycarboxylic acid, as sodium salt, and the remainder to 100% by weight (minus w % by weight for the dye) of blend salt, preferably Glauber's salt, and contains an amount w % by weight of dye (A), incorporated-in or sprayed-on, which is sufficient to impart a distinct color, preferably in a blue, red, violet or green shade, to the specks, principally in the range from 0.005 to 0.5% by weight, preferably from 0.01 to 0.2% by weight of dye (A).

The dyes are present in the detergents in minimal proportions. The weight ratio of colored specks ($S_P$) to the remainder of the detergent is, for example, in the range from 0.01/99.99 to 2/98, preferably in the range from 0.05/99.95 to 1/99. Neither do the compositions (P) to be employed in accordance with the invention have an adverse effect on any optical brighteners which may be present in the detergent, but instead are readily compatible with anionic detergent brighteners. If the detergents are used for cleaning textile goods under the generally alkaline conditions which are produced by the detergent composition, the dyes are hardly taken up at all or only in a labile manner onto the substrate, which means that they can be washed out in the same washing operation or in a subsequent washing or rinsing operation.

A further particular subject-matter of the invention is represented by the water-soluble polymer compositions which are coloured with (P), in particular the free-flowing granular materials ($S_P$).

The compositions (P) can also be employed for the production of printing pastes or inks using additives which are conventional per se (such as thickeners or carrier substances), particularly also in jet printing inks or for dyeing anodized aluminium, or also for dyeing fibrous substrates, for example hydrophilic substrates, in particular cellulose-containing substrates (for example cotton, viscose, paper and nonwovens), natural polyamides (wool, silk and leather) and synthetic fibres (polyamides and polyurethanes), and mixtures of corresponding textile fibres, by dyeing methods which are conventional per se.

In the following examples, parts are parts by weight and percentages are per cent by weight; the temperatures are given in degrees Celsius. "Residual salts" or "salt content" in the filter cake in the examples below is taken to mean inorganic salts which, as by-products from the dye synthesis, accompany the dye in the filter cake or press cake (mostly sodium chloride, bromide or/and sulphate).

EXAMPLE 1

A solution of 3 parts of benzyl alcohol in 100 parts of water is pre-set at room temperature (=20° C.), and 20 parts of a washed and dried filter cake of the dye of the formula

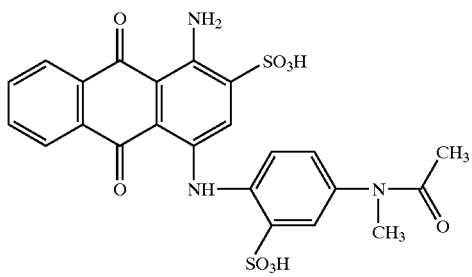

(1)

as the sodium salt containing 10% of residual salts are introduced, and the mixture is stirred until a clear solution has formed. A blue storage-stable solution is obtained. pH 7.5–8.5.

Instead of the washed and dried filter cake, it is also possible to employ the corresponding amount of commercially available product with a sodium sulphate content of 20%.

If desired, 0.4 parts of an aqueous microbicide based on 1,2-benzisothiazolin-3-one of pH >12 can be admixed. The resultant product has a pH of 8.5–9.5.

EXAMPLE 2

100 parts of a washed, moist filter cake of the dye of the formula (1) as the sodium salt with a water content of 60% and a salt content of 4% are diluted at room temperature with 140 parts of water. 6 parts of benzyl alcohol are stirred into the resultant mixture, and the mixture is stirred further at room temperature until a clear solution has formed. A blue storage-stable solution is obtained. pH 7.5–8.5.

EXAMPLE 3

100 parts of a washed, moist filter cake of the dye of the formula (1) as the sodium salt with a water content of 60% and a salt content of 4% are diluted with 140 parts of water at 80° C. and stirred until the dye has gone into solution. 6 parts of benzyl alcohol are stirred into the resultant solution, and the dye solution is cooled. A blue storage-stable solution is obtained.

EXAMPLE 4

100 parts of a washed, moist filter cake of the dye of the formula (1) as the sodium salt with a water content of 60% and a salt content of 4% are diluted with a mixture of 140 parts of water and 6 parts of benzyl alcohol at 60° C. and stirred until a clear solution has formed, then the dye solution is cooled. A blue storage-stable solution is obtained.

EXAMPLES 1(a), 1(b), 2(a), 2(b), 3(a), 3(b), 4(a) AND 4(b)

In an analogous manner to the blue acid dye of the formula (1), the yellow acid dyes of the following formulae are employed in Examples 1 to 4:

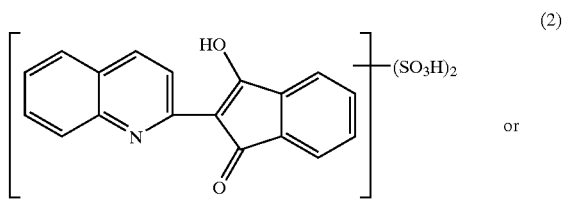

(2)

or

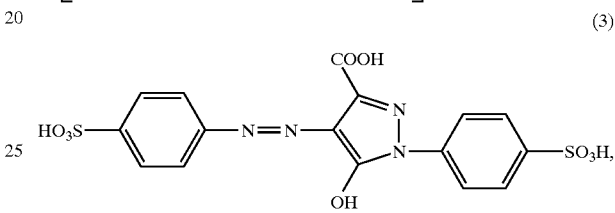

(3)

in each case as sodium salts. Yellow, storage-stable solutions are obtained.

EXAMPLES 1(c), 1(d), 2(c), 2(d), 3(c), 3(d), 4(c) AND 4(d)

In an analogous manner to the blue acid dye of the formula (1), the orange acid dyes of the following formulae are employed in Examples 1 to 4:

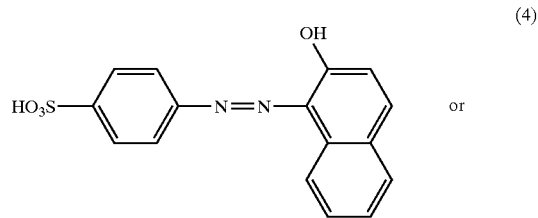

(4)

or

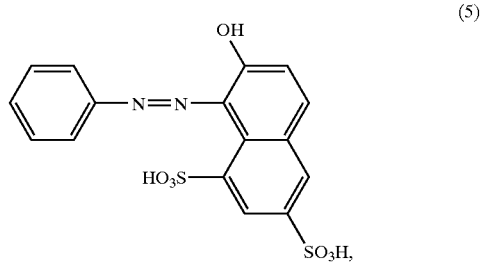

(5)

in each case as sodium salts. Orange, storage-stable dye solutions are obtained.

EXAMPLES 1(e), 1(f), 2(e), 2(f), 3(e), 3(f), 4(e) AND 4(f)

In an analogous manner to the blue acid dye of the formula (1), the red acid dyes of the following formulae are employed in Examples 1 to 4:

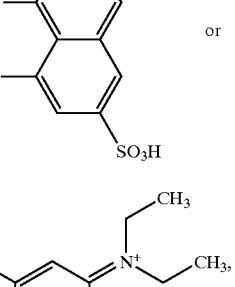

(6)

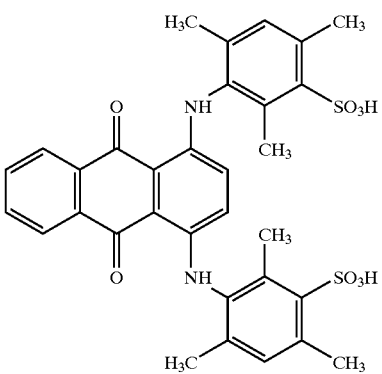

(10)

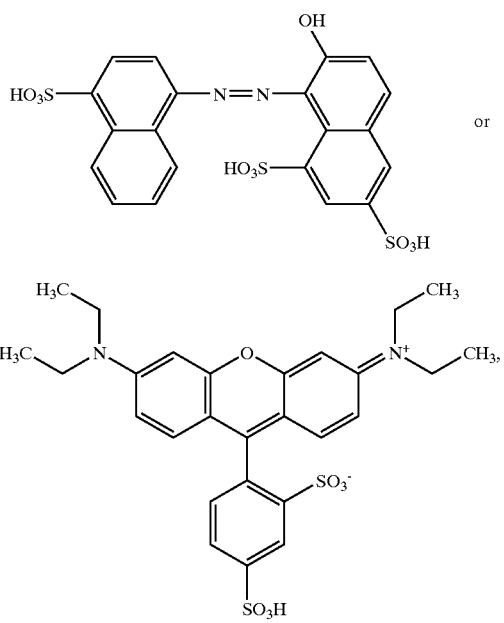

(7)

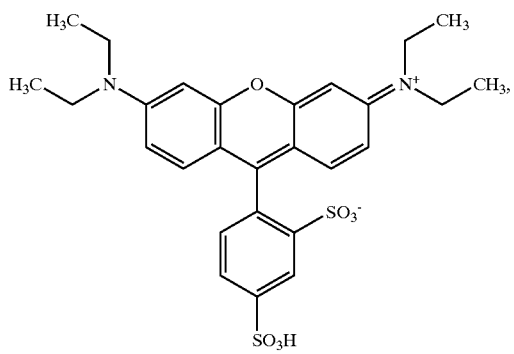

(11)

in each case as sodium salts. Red, storage-stable dye solutions are obtained.

EXAMPLES 1(g), 1(h), 1(i), 1(l), 2(g), 2(h), 2(i), 2(l), 3(g), 3(h), 3(i), 3(l), 4(g), 4(h), 4(i) AND 4(l)

In an analogous manner to the blue acid dye of the formula (1), the blue acid dyes of the following formulae are employed in Examples 1 to 4:

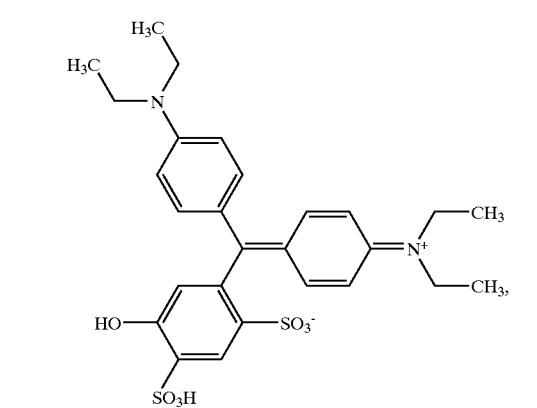

(8)

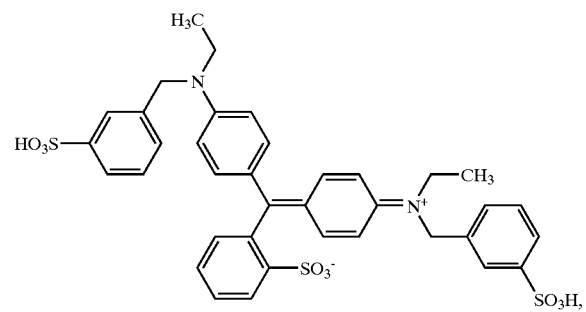

(9)

in each case as sodium salts. In each case, blue, storage-stable dye solutions are also obtained.

EXAMPLE 5

A solution of 4 parts of benzyl alcohol in 100 parts of water is pre-set at room temperature, and 10 parts of washed and dried filter cake of the dye of the formula (1) and 15 parts of washed and dried filter cake of the dye of the formula (2), each as sodium salts, are introduced, and the mixture is stirred until a clear solution has formed. A green storage-stable solution is obtained. pH 7.5–8.5.

If desired, 0.4 parts of an aqueous microbicide based on 1,2-benzisothiazolin-3-one of pH >12 can be admixed. The resultant product has a pH of 8.5–9.5.

EXAMPLE 6

50 parts of a washed, moist filter cake of the dye of the formula (1) as the sodium salt with a water content of 60% and a salt content of 4% and 75 parts of a washed, moist filter cake of the dye of the formula (2) as the sodium salt with a water content of 60% and a salt content of 4% are diluted at room temperature with 125 parts of water. 8 parts of benzyl alcohol are stirred into the resultant mixture, and the mixture is stirred further at room temperature until a clear solution has formed. A green storage-stable solution is obtained.

EXAMPLE 7

50 parts of a washed, moist filter cake of the dye of the formula (1) as the sodium salt with a water content of 60% and a salt content of 4% and 75 parts of a washed, moist filter cake of the dye of the formula (2) as the sodium salt with a water content of 60% and a salt content of 4% are diluted with 125 parts of water at 80° C. and stirred until the dyes have gone into solution. 8 parts of benzyl alcohol are stirred into the resultant solution, and the dye solution is cooled. A green storage-stable solution is obtained.

EXAMPLE 8

50 parts of a washed, moist filter cake of the dye of the formula (1) as the sodium salt with a water content of 60% and a salt content of 4% and 75 parts of a washed, moist filter cake of the dye of the formula (2) as the sodium salt with a water content of 60% and a salt content of 4% are diluted with a mixture of 125 parts of water and 8 parts of benzyl alcohol at 60° C. and stirred until a clear solution has formed, then the dye solution is cooled. A green storage-stable solution is obtained.

EXAMPLES 5(a), 5(b), 5(c), 5(d), 6(a), 6(b), 6(c), 6(d), 7(a), 7(b), 7(c), 7(d), 8(a), 8(b), 8(c) AND 8(d)

In an analogous manner to the blue acid dye of the formula (1), the blue acid dyes of the formulae (8), (9), (10) or (11) are employed in each of Examples 5 to 8, also giving green storage-stable solutions.

EXAMPLES 5(e), 5(f), 5(g), 5(h), 5(i), 6(e), 6(f), 6(g), 6(h), 6(i), 7(e), 7(f), 7(g), 7(h), 7(I), 8(e), 8(f), 8(g), 8(h) AND 8(i)

In an analogous manner to the yellow acid dye of the formula (2), the yellow acid dye of the formula (3) is employed in each of Examples 5 to 8(d), also giving green storage-stable solutions.

EXAMPLES 5(k), 5(l), 5(m), 5(n), 6(k), 6(l), 6(m), 6(n), 7(k), 7(l), 7(m), 7(n), 8(k), 8(l), 8(m), AND 8(n)

In an analogous manner to the blue acid dye of the formula (1), the red acid dyes of the formulae (6) or (7) are employed in Examples 5 to 8, giving orange storage-stable solutions, or the orange acid dyes of the formulae (3) or (4), giving orange-yellow storage-stable dye solutions.

EXAMPLE 9

100 parts of the solution of the orange acid dye of the formula (4) as the sodium salt, resulting from the coupling of diazotized sulphanilic acid with β-naphthol in aqueous solution, with a solids content of 20%, are mixed with 2.4 parts of benzyl alcohol at 60° C., and the resultant clear solution is cooled to room temperature. An orange storage-stable dye solution is obtained. pH 7.5–8.5.

EXAMPLES 10, 11 and 12

The procedure is as described in Example 9, with the difference that instead of the coupling solution of the orange acid dye of the formula (4), the coupling solutions of the orange acid dye of the formula (5), of the yellow acid dye of the formula (3) or of the red acid dye of the formula (6), in each case as sodium salts, are employed. Orange, yellow or red storage-stable dye solutions respectively are obtained.

Application Example A

A degreased and deoxidized workpiece of pure aluminium is anodically oxidized for 40–50 minutes with direct current at a temperature of 18–20° C., a voltage of 15–16 volts and a current density of 1.5 A/dm$^2$ in an aqueous solution comprising 18–22 parts of sulfuric acid and 1.2–7.5 parts of aluminium sulfate per 100 parts. An oxide layer with a thickness of about 20–24 μm is formed. After rinsing with water, the anodized aluminium sheet is dyed for 15 minutes at 60° C. in a solution consisting of 2.5 parts of the dye solution according to Example 1 in 1000 parts of deionized water whose pH has been adjusted to 5.5 with acetic acid and sodium acetate. After rinsing in water, the dyed aluminium sheet is sealed at 98–100° C. for 40–50 minutes in deionized water. A blue dyeing with good light fastness is obtained.

Application Example B

The procedure is as described in Application Example A, with the difference that the post-treatment is carried out in a solution of 3 parts of nickel acetate in 1000 parts of water under otherwise identical conditions. A blue dyeing with good light fastness is obtained.

Application Example C 50 parts of the dye solution from Example 1 are dissolved in 450 parts of water and stirred into a highly viscous solution consisting of 400 parts of water and 100 parts of methyl-Cellosolve with an average degree of polymerization and a degree of substitution of 1.5. The printing ink obtained in this way is applied by screen printing to a dry, oxidized aluminium sheet obtained by anodizing an aluminium alloy of the Al/Mg/Si 0.5 type for 30 minutes in a solution of 100 parts of chromic anhydride in 1000 parts of water at 53° C. and a current density of 1.2 A/dm$^2$. The printed sheet is dipped into boiling water for 10 minutes and rinsed well with cold water. A blue pattern on a weakly grayish background is obtained.

The dyes solutions of Examples 2–12 are employed in Application Examples A, B and C analogously to the dye solution of Example 1, giving dyeings of the respective shades.

Application Example D 100 parts of a 40% solution of a copolymer of acrylic acid and maleic acid in the molar ratio 7/3, with an average molecular weight $M_W$=70,000, as the sodium salt, are mixed with 120 parts of Glauber's salt and with 0.15 parts of the dye solution produced in accordance with Example 1, and the resultant composition is extruded and granulated in an extrusion compactor/granulator (particle size in the range from 0.3 to 2 mm). The resultant granular material is blue and can be used as blue-colored specks for detergent granules. A detergent with the composition according to EMPA Article No. 602 (phosphate-free detergent, IEC Reference Detergent Type A), for example, is suitable for this purpose. 99.5 parts of detergent of the same particle size are mixed with 0.5 parts of the blue-colored specks.

Application Example E 100 parts of a 40% solution of a copolymer of acrylic acid and maleic acid in the molar ratio 7/3, with an average molecular weight $M_W$=70,000, as the sodium salt, are mixed with 120 parts of Glauber's salt and the resultant composition is extruded and granulated in an extrusion compactor/granulator (particle size in the range from 0.3 to 2 mm). The resultant granular material is sprayed evenly in a spray unit with 0.05 parts of the dye solution produced in accordance with Example 1. The granular material coloured in this way is blue and can be used as blue-colored specks for detergent granules. A detergent with the composition according to EMPA Article No. 602 (phosphate-free detergent, IEC Reference Detergent Type A), for example, is suitable for this purpose. 99.5 parts of detergent of the same particle size are mixed with 0.5 parts of the blue-colored specks.

In an analogous manner, instead of the dye solution of Example 1, the dye solutions of Examples 2 to 4 or 1(e) to 8(i) are employed for the production of blue, red or green specks, or also mixtures of a blue [Examples 1 to 4, 1(g) to 4(l)] and a red dye solution (Examples 1(e) to 4(f) or 12] for the production of violet specks.

Application Example F 10 parts of the dye solution according to Example 1 are mixed with 75 parts of demineralized water and 15 parts of diethylene glycol at 60° C. After cooling to room temperature, a blue printing ink is obtained which is highly suitable for ink-jet printing on paper or textile materials.

What is claimed is:

1. Concentrated dye composition (P) which is a solution of y % by weight of at least one anionic dye (A) in a solution of x % by weight of benzyl alcohol (B) in water, and z % by weight of at least one formulation additive (F), in which x is a number in the range from 0.5 to 4, y is a number in the range from 5 to 35 and z is a number in the range from 0 to 2, and (F) is ($F_1$) an antimicrobial agent, or/and ($F_2$) at least one acid, at least one base and/or at least one buffer or pH adjustment, and is essentially free from alcohols other than (B) and from solvents or solubilizers other than water and (B).

2. Concentrated dye composition (P) according to claim 1, wherein y is a number in the range of from 12 to 30.

3. Concentrated dye composition (P) according to claim 1 with a pH in the range from 5 to 11.

4. Concentrated dye composition (P) according to claim 1, produced by mixing at least one dye (A) with an aqueous solution of (B) and optionally (F), or by mixing (B) with a concentrated solution or/and suspension of (A) and optionally admixing (F).

5. A method for dyeing or colouring a substrate comprising the steps of:

providing a substrate;

providing a composition (P) which is a solution of y % by weight of at least one anionic dye (A) in a solution of x % by weight of benzyl alcohol (B) in water, and z % by weight of at least one formulation additive (F), in which x is a number in the range from 0.5 to 4, y is a number in the range from 5 to 35 and z is a number in the range from 0 to 2, and (F) is ($F_1$) an antimicrobial agent, or/and ($F_2$) at least one acid, at least one base and/or at least one buffer for pH adjustment, and is essentially free from alcohols other than (B) and from solvents or solubilizers other than water and (B); and contacting said substrate with said composition (P).

6. The method of claim 5, wherein said substrate is a hydrophilic, non-fibrous substrate selected from the group consisting of oxide layers produced artificially on aluminum or aluminum alloys, polymer containing compositions, plastics and coatings.

7. The method of claim 6 wherein said hydrophilic, non-fibrous substrate is plastic and the plastic is a water-soluble polymer (S), by which a colored plastic composition ($S_P$) is produced.

8. A method for the production of printing pastes or inks comprising the steps of:

providing a composition (P) which is a solution of y % by weight of at least one anionic dye (A) in a solution of x % by weight of benzyl alcohol (B) in water, and z % by weight of at least one formulation additive (F), in which x is a number in the range from 0.5 to 4, y is a number in the range from 5 to 35 and z is a number in the range from 0 to 2, and (F) is ($F_1$) an antimicrobial agent or/and ($F_2$) at least one acid, at least one base and/or at least one buffer for pH adjustment, and is essentially free from alcohols other than (B) and from solvents or solubilizers other than water and (B);

providing a printing paste or ink additive selected from the group consisting of: thickeners, carrier substances and combinations thereof; and combining said composition (P) with said additive.

9. A method for colouring free-flowing material ($S_G$) selected from granular detergents and granular water soluble polymers, comprising the steps of:

providing a composition (P) which is a solution of y % by weight of at least one anionic dye (A) in a solution of x % by weight of benzyl alcohol (B) in water, and z % by weight of at least one formulation additive (F), in which x is a number in the range from 0.5 to 4, y is a number in the range from 5 to 35 and z is a number in the range from 0 to 2, and (F) is ($F_1$) an antimicrobial agent, or/and ($F_2$) at least one acid, at least one base and/or at least one buffer for pH adjustment, and is essentially free from alcohols other than (B) and from solvents or solubilizers other than water and (B);

providing a free-flowing material ($S_G$); and contacting said composition (P) with said free-flowing material($S_G$).

10. A coloured hydrophilic, non-fibrous substrate, selected from the group consisting of printing pastes, jet inks, and aqueous carboxylic polymers, comprising:

said hydrophilic, non-fibrous substrate and the composition of claim 1.

11. A coloured plastic composition ($S_P$) in which the plastic is a water-soluble polymer (S) which contains the composition of claim 1.

12. A printing paste or ink or coloured free-flowing material selected from the group consisting of granular detergents and granular water-soluble polymers, which contains the composition of claim 1.

13. Concentrated dye composition (P) according to claim 1, in which the anionic dyes (A) are selected from the group consisting of:

($A_1$) acid dyes,
($A_2$) direct dyes,
($A_3$) mordant dyes, and
($A_4$) reactive dyes, optionally in hydrolyzed form.

14. A coloured plastic composition according to claim 11 in granular form wherein the water soluble polymer (S) is a polycarboxylic acid sodium salt blended with blend salt, containing a dye (A) incorporated or sprayed on in the form of (P), so that the concentration w % of dye (A) in the colored plastic composition ($S_P$) is in the range of 0.005 to 0.5% by weight.

* * * * *